3,466,231
MANUFACTURE OF NICKEL ELECTRODES FOR ALKALINE CELLS

Donald M. MacArthur, New Providence, N.J., assignor to Bell Telephone Laboratories, Incorporated, Murray Hill, Berkeley Heights, N.J., a corporation of New York
No Drawing. Filed Nov. 16, 1967, Ser. No. 683,451
Int. Cl. B01k 1/00; C23b 11/00
U.S. Cl. 204—56      4 Claims

ABSTRACT OF THE DISCLOSURE

The specification describes a technique for activating nickel electrodes for nickel-cadmium cells. If a prescribed amount of chloride ion is added to the standard nickel nitrate electrolyte during cathodic precipitation an improvement in the cycle life of the nickel electrode results.

---

This invention relates to nickel-cadmium cells and particularly to methods for preparing electrodes which evidence improved electrode cycle life.

Foraminous electrodes for nickel-cadmium cells are conventionally activated by the cathodic precipitation technique. This method involves electrolyzing the foraminous plaque as the cathode in a solution of a nickel salt such as nickel nitrate. Nickel hydroxide precipitates in the interstices of the plaque to form the active material for the battery electrode.

It has now been found that if the nickel salt solution contains a critical amount of a soluble chloride, electrodes treated in this solution exhibit significantly longer cycle life. Specifically, it has been found that electrodes activated in this solution give twice the number of deep charge-discharge cycles before their capacity drops significantly as compared with electrodes prepared using a similar solution without chloride.

The electrolyzing conditions and parameters are standard in the art. The concentration of nickel nitrate can vary from 0.1 M to saturation. Concentrations in the range of 2.0 M to 7 M are most desirable in terms of efficiently producing uniformly impregnated electrodes at a rapid rate. Current densities in the range of 0.1 to 7.0 amperes per square inch are useful and again the higher current densities, 2.0 to 7.0 amperes per square inch, are preferred. The temperature of the electrolyte does not appear to be an important factor. Prior experience with cathodic precipitation indicated no appreciable difference in experiments conducted at 25° C., 50° C. and 70° C.

The following example illustrates the practice of the invention.

Nickel foil electrodes were made cathodic in 0.5 M $Ni(NO_3)_2$ containing varying amounts of NaCl. The cathode current density was maintained at approximately 0.032 ampere per square inch of real surface area. Platinum anodes were used but carbon, or other noncontaminating electrode materials can be used as well. Nickel anodes which have the virtue of replenishing nickel ions in the solution may also be used. Total current passed in each case was 31 coulombs per square inch. In those examples in which the molarity of nickel nitrate was 2, the current density was 0.16 ampere per square inch and the total current passed was 58 coulombs per square inch. The plates activated in this way were then electrically cycled to determine their cycle life. Cycling consisted of discharging to approximately zero percent of capacity and recharging to capacity both at a C/2 rate in 30 percent KOH. The results of these studies are tabulated in the following table. The cycle life given is the number of cycles for which the plate delivered at least 50 percent of original capacity.

TABLE

| Molarity of Nickel Nitrate | Molarity of Chloride | Number of cycles |
|---|---|---|
| 0.5 | No chloride | 65 |
| 0.5 | 0.025 | 57 |
| 0.5 | 0.1 | 50 |
| 0.5 | 0.5 | 108 |
| 0.5 | 1.0 | 90 |
| 0.5 | 2.0 | 78 |
| 0.5 | Saturated | 75 |
| 2.0 | No chloride | 90 |
| 2.0 | 0.35 | 50 |
| 2.0 | 0.5 | 150 |
| 2.0 | 1.0 | 130 |
| 2.0 | 2.0 | 82 |

From the data of the table it is seen that the concentration of chloride is fairly critical approaching 0.5 M and the effectiveness of the chloride additive begins to decline significantly at concentrations above 1.0 M. On the basis of extrapolated data a range of chloride concentration of 0.4 M to 1.5 M can be prescribed as critical to obtaining the useful benefits of this invention.

The chloride can be added in the form of any soluble salt such as the alkali metal chlorides, alkaline earth metal chlorides, ammonium chloride, hydrochloric acid or any equivalent of these.

Various additional modifications and extensions of this invention will become apparent to those skilled in the art. All such variations and deviations which basically rely on the teachings through which this invention has advanced the art are properly considered within the spirit and scope of this invention.

What is claimed is:
1. In the fabrication of nickel positive electrodes for alkaline cells the step of activating the nickel electrode by electrolyzing the nickel electrode as cathode at a current density in the range of 0.1 to 7.0 amperes per square inch in an aqueous electrolyte consisting essentially of nickel nitrate and chloride ions having concentrations in the range of 0.5 M to saturation and 0.4 M to 1.5 M respectively.
2. The method of claim 1 wherein the nickel nitrate concentration is in the range of 2.0 M to 7.0 M.
3. The method of claim 2 wherein the current density is in the range of 2.0 to 7.0 amperes per square inch.
4. The method of claim 1 wherein the chloride ion concentration is approximately 0.5 M to 1.0 M.

References Cited

UNITED STATES PATENTS 3,203,879   8/1965   Mueller _____ 204—56

FOREIGN PATENTS 613,025   1/1961   Canada.

HOWARD S. WILLIAMS, Primary Examiner
R. L. ANDREWS, Assistant Examiner

U.S. Cl. X.R.
204—96